Nov. 15, 1955    H. B. MILLER    2,723,825
FARE BOX SUPPORT

Filed March 20, 1951    2 Sheets-Sheet 1

Inventor
Harry B. Miller
by Roberts, Cushman & Graves
Att'ys.

Nov. 15, 1955   H. B. MILLER   2,723,825
FARE BOX SUPPORT

Filed March 20, 1951   2 Sheets-Sheet 2

Inventor
Harry B. Miller
by Roberts, Cushman & Grover
Att'ys.

United States Patent Office 2,723,825
Patented Nov. 15, 1955

2,723,825
FARE BOX SUPPORT

Harry B. Miller, Warwick, R. I., assignor to Max L. Grant, Providence, R. I.

Application March 20, 1951, Serial No. 216,648

6 Claims. (Cl. 248—358)

This invention pertains to fare collection apparatus and more especially to a novel support for such a mechanism.

In recent years the simple box of earlier days into which the passenger tossed his nickel has been replaced by more or less elaborate apparatus designed to receive the multiple fares of present-day usage, to segregate coins of different denominations, to count the fare, to register total fares collected, and to perform other incidental operations all automatically and involving a complication of mechanism often including parts, for example electrical contactors, whose intended function is adversely affected by shocks or vibration. On the other hand, the street railway car, traveling on relatively smooth, rigid rails and having a very heavy chassis, has been largely replaced by buses whose bodies are slung upon springs and which travel upon highways which are never entirely smooth, and often rutted and otherwise very rough, so that any fare collecting apparatus mounted in such a vehicle is subjected to constant vibration of various amplitudes ranging from vibrations of a wave length above the audible frequency down to slow oscillations of relatively large amplitude.

Relatively slow oscillations of the fare collection mechanism as a whole, even though the oscillations be of substantial amplitude, does not too seriously interfere with the normal functioning of its parts, but when the machine is subjected to short vibrations of high frequency, that is to say vibrations within the range of sound frequencies, the lighter, movable parts of the apparatus, for example springs, electrical contacts, etc., and even coins passing through the apparatus may be set into sympathetic vibration of such intensity as to prevent them from functioning in the intended manner or to cause them to operate abnormally; for instance such vibration of the apparatus may cause jamming of the coins or improper registration of the fares collected.

One object of the present invention is to provide a mounting for the fare collection apparatus so designed as to minimize the transmission of short amplitude vibrations of high frequency from the vehicle to the moving parts of the mechanism. A further object is to provide supporting means for a fare collecting apparatus so designed that the position of the center of gravity of the apparatus as a whole does not shift substantially in response to relatively slow, larger amplitude vibrations of the vehicle on which the apparatus is mounted. A further object is to provide a pedestal-type support for a fare collection box such that high frequency vibrations of the vehicle body are damped in passing through the pedestal.

It is requisite that the operation of the fare collection apparatus be clearly visible to the driver of the vehicle and for the convenience of different drivers the orientation of the apparatus must be varied, but because of the mounting of the apparatus on a moving vehicle, it is necessary to fasten the base of the apparatus securely to the floor. A further object of the present invention is to provide supporting means for fare collection apparatus such that although its base is fixed rigidly to the vehicle floor, the casing which houses the mechanism may, without manipulation of bolts or recourse to the use of tools, be oriented to suit the requirements of any individual driver, although so attached to the base that it cannot be removed by an unauthorized person. Other and further objects and advantages of the invention will be pointed out in the following more detailed description and by reference to the annexed drawings wherein:

Figure 4:
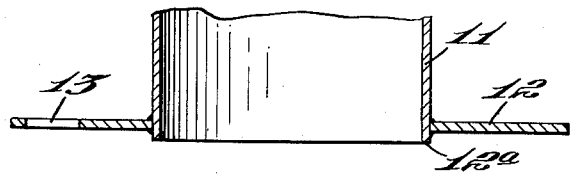
Fig. 4 is a fragmentary, diametrical, vertical section similar to Fig. 2, but showing only the lower part of the support, the vibration absorbing means and the anchoring means being omitted.

Referring to the drawings the numeral 10 indicates fare collecting apparatus according to the present invention comprising a box which is designed to receive the fares and which may include counting, assorting and recording mechanism or the like, this box being mounted upon a columnar support here shown as a cylindrical pedestal 11 provided near its lower end (Fig. 4) with a horizontally extending member 12, here shown as a rigid annular flange which is rigidly secured to the tubular part 11, for example, by welding or by screw threading and whose lower surface is preferably spaced a short distance up from the lower edge 12ᵃ of the tubular member 11. This rigid flange 12 is of substantial diameter, for example 10 inches and is provided with a plurality of openings 13, three such openings here being indicated equally spaced apart and which are designed to receive anchoring bolts as hereafter described.

Figures 5, 6:
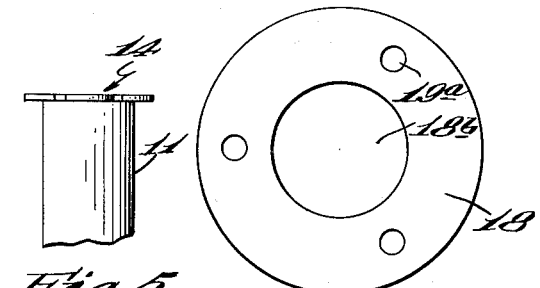
Fig. 5 is a fragmentary elevation of the upper portion only of the support shown in Fig. 1.
Fig. 6 is a plan view to smaller scale showing one of the cushioning mats employed in the practice of the invention.

At its upper end the tubular column 11 is provided with a horizontal flange 14 (Fig. 5) which may be annular so as to be pressed on the upper end of the column or it may be an imperforate plate coaxial with the column, the flange 14 being rigidly secured to the column, for example by welding or screw threading. This flange 14 forms the immediate support for the fare collecting box 15, the bottom of which, as hereafter described being properly constructed to provide for its attachment to the flange 14.

The numeral 16 indicates a part upon which the fare collecting apparatus is to be mounted, for example, the floor of a vehicle, and the column 11 is anchored to this floor 16 by means, including vibration damping parts indicated generally at 17.

Figure 8:
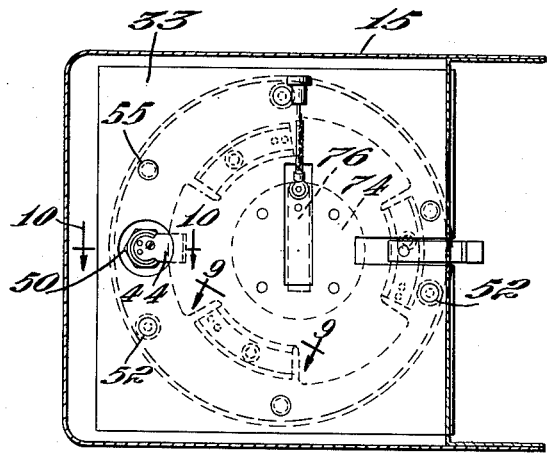
Fig. 8 is a horizontal section on the line 8—8 of Fig. 1.
Figure 1:
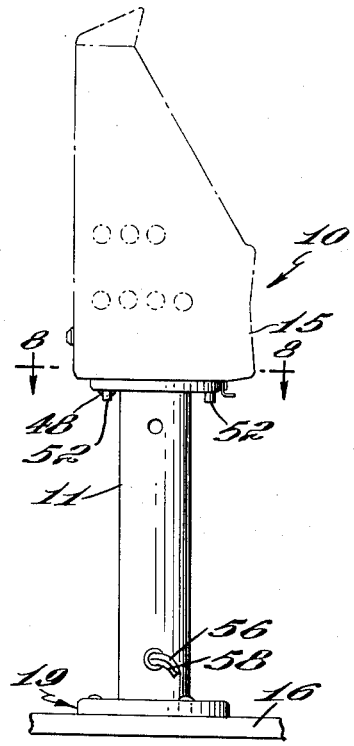
Fig. 1 is a side elevation showing a fare collecting box mounted upon a vertically elongate columnar support embodying the present invention.
Figure 7:
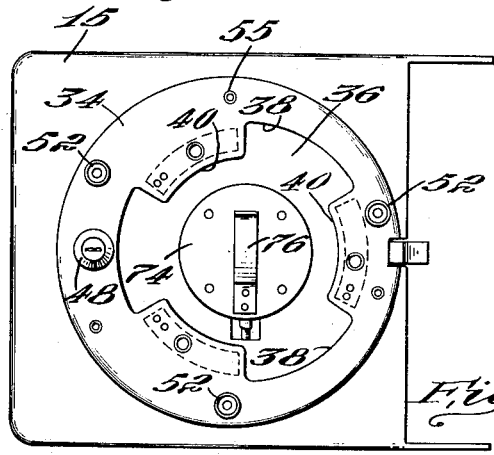
Fig. 7 is a bottom view of a fare box designed to cooperate with the support of the present invention.
Figure 3:
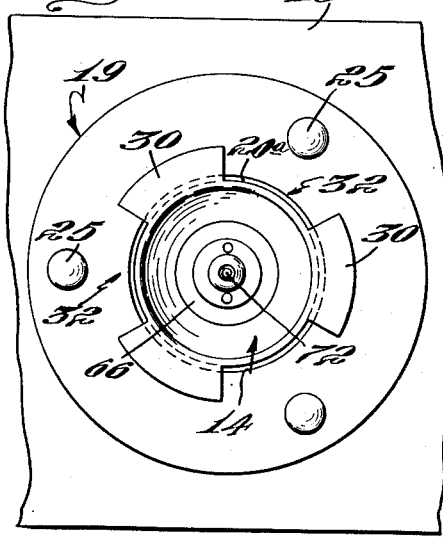
Fig. 3 is a plan view of the top of the support, the fare box being omitted.

This anchorage means comprises an annular mat 18 (Figs. 2 and 6) having a central opening 18ᵇ of a diameter slightly greater than the external diameter of the tubular column 11. This mat 18 is of an external diameter somewhat greater than that of the flange 12 and is provided with openings 19ᵃ corresponding in number to the openings 13 and so spaced that the openings 19ᵃ may be registered with the openings 13. This mat 18 is of a vibration-absorbent character and preferably resilient. For instance it may be of soft vulcanized rubber or it may be some compound material, for example rubber, with fibers or fabric incorporated in it. This mat 18 is placed directly below the flange 12 in concentric relation to the latter and supports the entire weight of the fare collecting apparatus, including that of the column 11. Above the flange 12 there is arranged the second vibration-absorbing mat 18ᵃ which may be identical in size and material with the mat 18. The mats 18 and 18ᵃ and the flange 12 are housed within a shallow inverted cup-like member 19 (Figs. 1, 2 and 3) of rigid material, for example steel, having the annular bottom member 20 which rests upon the upper mat 18ᵃ and the downwardly directed peripheral flange or skirt 23 which embraces the edges of the mats 18 and 18ᵃ. The height of the flange 23 and combined thickness of the mats 18, 18ᵃ and flange 12 are such that when the parts are assembled there is clearance 23ᵃ below the lower edge of the flange 23 and the upper surface of the floor 16. The thickness of the mat 18 when uncompressed, is greater than the length of the tubular member 11 extending below the flange 12. The bottom 20 has a central opening 20ᵃ for the reception of the tubular member 11, this opening being of somewhat greater diameter than the part 11 so that there is clearance 21 between the inner edge of the opening in the part 20 and the column 11.

The bottom 20 is provided with a plurality of openings 20ᵇ corresponding in number to the openings 19ᵃ in the mats 18, 18ᵃ and flange 12, so spaced that in assembling the parts the openings in the bottom 20 may be arranged in axial alignment with the openings 19ᵃ in the mats 18 and 18ᵃ and with the openings 13 in the flange 12. Before assembling the cover member with the parts 18, 18ᵃ and 12, rigid sleeve members 24 are disposed in the aligned openings in the parts 18 and 18ᵃ and 3, these sleeve members being of a length less than the thickness of the assembled parts 18, 18ᵃ and 12 before the parts 18 and 18ᵃ are subjected to compression but greater than the depth of the skirt 23. Having assembled the sleeves 24 with the other parts as just described, the cover member is put in place and bolts 25 are passed down through the openings in the cover and through aligned openings in the floor 16. Nuts 27 are applied to these bolts, the nuts being tightened sufficiently to pull the cover down until the cushioning mats 18 and 18ᵃ have been placed under compression and until the cover comes into contact with the upper ends of the sleeves 24. The holes 13 in the flange are made larger than the sleeves to permit angular rocking movement of the flange without binding on the sleeves. Since the sleeves have an overall length greater than the depth of the skirt 23, when the cover is pulled down tight by the bolts there will still remain a small clearance between the lower edge 23ᵃ of the skirt and the floor so that the entire structure rests solely on the cushioning material. That portion of the column below the flange serves to prevent inward displacement of the lower cushion member when under pressure and yet is short enough so that even when the cover is pulled down the lower edge 12ᵃ will not contact the floor.

As thus arranged the flange 12 is held between the two cushioning mats 18 and 18ᵃ and thus it is possible for the apparatus comprising the column 11 and the box 15 to rock through a very small arc about a point adjacent to the floor 16, although the apparatus is firmly anchored to the floor. Such rocking motion is resisted by the resiliency of the cushion members 18 and 18ᵃ, the latter also functioning to absorb vibrations of high frequency which might otherwise be transmitted from the floor 16 to the column 11.

With the arrangement described, the center of mass of the combined box 15 and tubular column 11 is at a point above the upper end of the column so that the combined apparatus functions as an inverted pendulum. With such an arrangement horizontal motion of small amplitude imparted to the lower end of the column 11 is ineffective to produce any corresponding vibration of the box 15, the center of mass tending to remain fixed in position with respect to slight lateral motion of the lower end of the column. With this arrangement not only are high frequency vibrations dampened or absorbed by the cushion elements 18 and 18ᵃ in whatever direction such vibrations may be directed but oscillations of relatively low frequency at the level of the floor 16 become substantially ineffective to cause the box 15 and its contents to vibrate or chatter.

Referring to Figs. 2, 3 and 7 to 11 inclusive, the top flange 14 of the pedestal is shown as provided with arcuate tongues 30, three in number equally spaced about the flange, between which are arcuate recesses 32, and is made fast to the column in any suitable manner as by welding or by threaded engagement with the top of the column.

Figure 2:
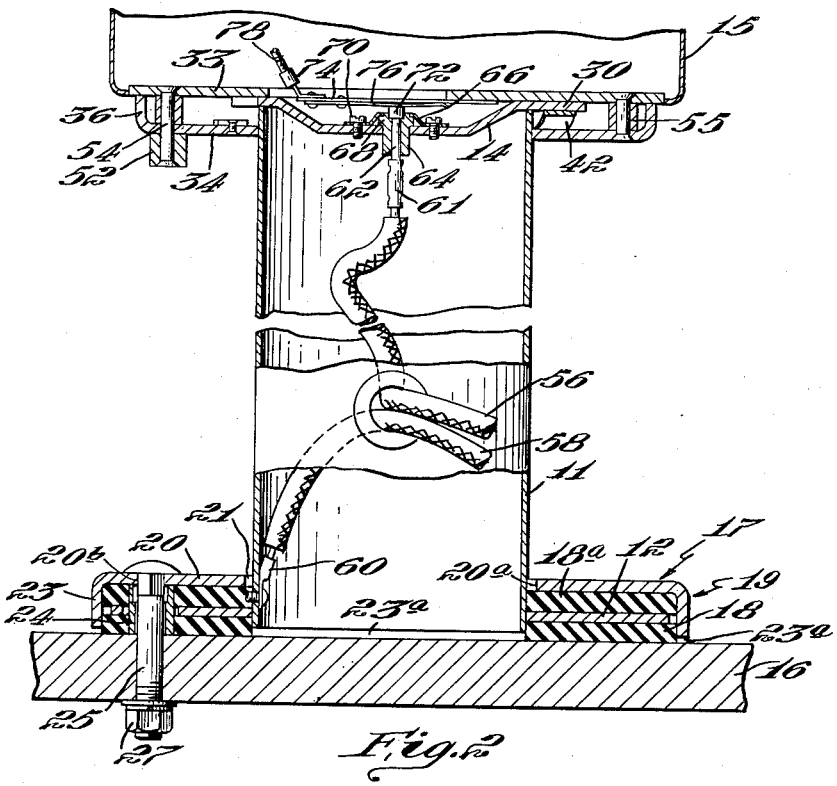
Fig. 2 is a fragmentary, diametrical, vertical section, to larger scale through the lower part of the box and the support shown in Fig. 1, the support being shown as anchored to a part which may, for example, be the floor of the vehicle.
Figure 9:
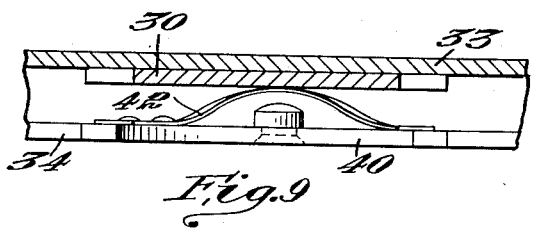
Fig. 9 is a vertical section on the line 9—9 of Fig. 8.
Figure 10:
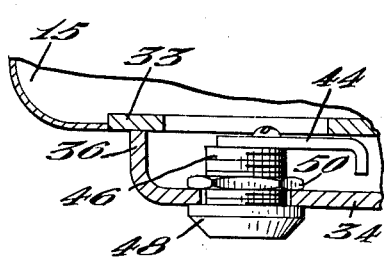
Fig. 10 is a vertical section on the line 10—10 of Fig. 8.

The bottom of the box 15 (Fig. 1) is comprised of a flat rigid plate 33 to which is made fast a coupling which consists of a cup-like member having a bottom wall 34 and a peripheral flange 36, the rim of which bears against the under side of the bottom 33. The bottom wall 34 of the coupling has in it a hole 36 substantially equal in diameter to the column, around which are arranged equally spaced arcuate recesses 38, thereby forming arcuate tongues 40 corresponding to the arcuate tongues 30 at the upper end of the column. By placing the box 15 over the flange 14 so that the arcuate recesses 38 coincide with the arcuate tongues 30 and the arcuate tongues 40 intervene therebetween, the upper end of the column and flange may be passed through the hole 36 to bring the flange 14 into engagement with the bottom 33, whereupon it is possible by turning the box relative to the column, to bring the arcuate tongues 30 into registry with the arcuate tongues 40, thus connecting the box securely to the pedestal. A series of springs 42, three in number (Figs. 8 and 9), made fast to the inside of the arcuate tongues 40 below the tongues 30, act to urge the tongues 30 into frictional contact with the bottom 33 when the box is mounted on the upper end of the column, thereby preventing accidental turning of the box relative to the column. The springs 42, as illustrated in Figs. 2 and 9, are made fast, for example by rivets at one end to the tongues, are bow-shaped so that they substantially fill the space between the bottom wall 34 and bottom 33, their bows pressing against the tongues 30 and their free ends pressing against the tongues 40.

In order to prevent unauthorized removal of the box from the column, positive locking means 44 (Fig. 10) is provided, such locking means comprising interengaging parts which are controlled by a key so that once locked, the box cannot be removed from the column except by a person possessing a key. As illustrated, the lock comprises a barrel 46 set into an aperture in the bottom wall 34, which is secured in place by engagement of the head 48 of the barrel with the outside of the bottom, and a nut 50 threaded on the barrel and engaged with the inside of the bottom. The head 48 has a keyhole therein for reception of the shank of the key, which when turned, operates to swing the locking means 44 inwardly. While the locking means prevents unauthorized removal of the box from the column, it is so designed as to permit limited turning movement of the box relative to the column so that the driver of the vehicle may turn the box to the most convenient position of orientation for his use and observation without requiring the manipulation of bolts or the use of tools, and while the column still remains firmly anchored to the floor. This is effected by locating the lock so that the locking means 44 extends into one of the arcuate apertures 32 between the tongues 30. While thus located, it is therefore impossible to turn the box far enough in one direction or the other to move the arcuate tongues 30 out of registry with the arcuate tongues 40, hence the box cannot be lifted free of the column. At the same time, it permits rotation of the box through an arc which is approximately one-half the length of an arcuate tongue 30.

When the box is removed from the column, it is desirable to be able to set it down in an upright position without danger of its tilting or falling over. Accordingly feet 52, three in number, are attached to the bottom structure by rivets 54 fastened through the bottom 33 and bottom wall 34. The feet 52 should be long enough so that when the box is set on them, the coupling and the lock will be held clear of the floor. Rivets 55 may also be employed for making the coupling fast to the bottom in addition to the leg rivets.

There are a number of current consuming units in the fare box and the current which is supplied to the box 15 is preferably supplied thereto by way of conductors 56 and 58 (Fig. 2) located in the column. The conduits extend from the column through an aperture near the bottom thereof for connection to an outside source of power, for example the storage batteries of a bus or electric car. The conduit 56 inside of the column is grounded by attachment of its end by means of a tab 60 to the metal wall of the column. To provide for automatic connection of the conduit 56 with the wiring inside of the box 15 without need for manipulation, screws, plugs or resorting to the use of tools, the free end of the conduit 56 is permanently coupled by means of a pinch or squeeze sleeve 61 to a stem 62 extending vertically upward through an insulating grommet 64 situated centrally of the plate 14, the grommet being fastened in place by a cap 66 overlying its head 68 at the upper side of the plate and secured in place by screws 70. The cap has a hole therein through which passes the upper end of the stem 62 and the latter has on it a head 72. A thin insulating plate 74 is riveted to the lower side of the bottom 33 over a hole in the bottom so as to be concentric with the disc 14 and has riveted to its under side a spring finger 76 arranged radially with its inner end engaged with the head 72 of the stem 62 so that throughout rotation of the box 15 with reference to the column, it will remain in contact with the head. A lead 78 is riveted to the upper side of the plate 74 and the finger 76 extends upwardly through the hole in the bottom and provides means for carrying current to the current consuming units in the box. It is evident by this arrangement that when the box 15 is placed on the top of the column, the yieldable spring 76 will automatically be engaged with the head 72 and thus complete the connection between the conductors in the column and the electric wiring in the box, and that rotation of the box with reference to the column, during adjustment of the box on the column will not in any way interfere with the continuous flow of current.

While one desirable embodiment of the invention has here been illustrated by way of example, it is to be understood that the invention is broadly inclusive of any and all modifications falling within the scope of the appended claims.

I claim:

1. Means for anchoring to a support the lower end of a pedestal adapted to receive at its upper end a fare collection box comprising a horizontal annular flange fast to its lower end, annuli of vibration-absorbent material above and below said flange respectively, an inverted rigid annular cup whose bottom rests upon the upper of said absorbent annuli and whose side wall embraces both annuli and the pedestal flange but whose lower edge is spaced from the support, and means for bolting said cup to said support.

2. Means for anchoring to a support the lower end of a pedestal adapted to receive at its upper end a fare collection box comprising a horizontal flange adjacent to but spaced from its lower end, vibration-absorbent material above and below said flange respectively, a rigid cover overlying the upper of said absorbent members, said absorbent members and the flange having therein coaxial apertures, a rigid vertical sleeve passing through each of said coaxial apertures, said sleeves being of uniform length and longer than the depth of the flange and a bolt passing through each sleeve and through an aperture in the cover, the bolts anchoring the pedestal to said support.

3. Means for anchoring to a support the lower end of a pedestal adapted to receive at its upper end a fare collection box comprising a rigid horizontal flange adjacent to but spaced from its lower end, vibration-absorbent members above and below said flange respectively, a rigid cover of larger diameter than the flange overlying the upper of said absorbent members, said cover having a skirt-like flange of less depth than the combined thickness of the vibrational absorbent members so that its lower edge is spaced from the support, said cover having a hole in it of larger diameter than the diameter of the column through which the column rises, providing an annular clearance between the rim of the hole and the column, said cover, vibration absorbent members and flange having registering holes therethrough perpendicular to the support and bolts anchoring the cover to the support.

4. Means for anchoring to a support the lower end of a pedestal adapted to receive at its upper end a fare collection box comprising a rigid horizontal flange adjacent to but spaced from its lower end, vibration absorbent members above and below said flange respectively, a rigid cover overlying the upper of said absorbent members and having a skirt extending downwardly about said members, said lower absorbent member being thicker than the length of the column below the rigid flange and said composite thickness of the absorbent members and the rigid flange being greater than the depth of the cover skirt, means for drawing the cover downwardly over said members and flange to compress the absorbent members and means for limiting downward movement of the cover to prevent engagement of tis lower edge with the support.

5. Means for anchoring to a support the lower end of a pedestal adapted to receive at its upper end a fare collection box comprising a rigid horizontal flange adjacent to but spaced from its lower end, vibration absorbent members above and below said flange respectively, a rigid cover overlying the upper absorbent member, said cover having a skirt embracing the edges of the absorbent members and being shorter in depth than the composite thickness of the absorbent members and the included flange, said cover, absorbent members, and rigid flange having registering holes therein, bolts arranged to be placed in said holes for anchoring the cover to the support, and rigid sleeves on said bolts passing through said registering holes, said sleeves having an overall length greater than the depth of the skirt but less than the uncompressed thickness of the absorbent members and the included flange.

6. Means for anchoring to a support the lower end of a pedestal adapted to receive at its upper end a fare collection box comprising a rigid horizontal flange adjacent to but spaced from its lower end, vibration-absorbent members above and below said flange respectively, a rigid cover overlying the upper absorbent member, said cover having a skirt embracing the edges of the absorbent members and being shorter in depth than the composite thickness of the absorbent members and the included flange, said cover, absorbent members and rigid flange having registering holes therein, bolts arranged to be placed in said holes for anchoring the cover to the support and rigid sleeves on said bolts, the opposite ends of which engage the inside of the cover and the support respectively, said sleeves having an overall length greater than the depth of the skirt but less than the uncompressed thickness of the absorbent members and the included flange.

(References on following page)

References Cited in the file of this patent

UNITED STATES PATENTS

| | | |
|---|---|---|
| 878,043 | Chrisman | Feb. 4, 1908 |
| 885,460 | Felknor | Apr. 21, 1908 |
| 943,709 | Sherwood | Dec. 21, 1909 |
| 1,222,739 | De Chime | Apr. 17, 1917 |
| 1,240,190 | Forth | Sept. 18, 1917 |
| 1,365,817 | Cox | Jan. 18, 1921 |
| 1,387,288 | Menifee | Aug. 9, 1921 |
| 1,720,619 | Baldwin | July 9, 1929 |
| 1,727,609 | Kramer | Sept. 10, 1929 |
| 1,791,815 | Jantsch | Feb. 10, 1931 |
| 1,809,986 | Paton | June 16, 1931 |
| 1,820,220 | Geyer | Aug. 25, 1931 |
| 1,835,577 | Terry | Dec. 8, 1931 |
| 1,876,704 | Lipcot | Sept. 13, 1932 |
| 1,932,014 | Frankford | Oct. 24, 1933 |
| 1,997,254 | Forsythe | Apr. 9, 1935 |
| 1,998,206 | Rosenzweig | Apr. 16, 1935 |
| 2,039,018 | Miller | Apr. 28, 1936 |
| 2,097,332 | Krumhar | Oct. 26, 1937 |
| 2,214,516 | Vernon | Sept. 10, 1940 |
| 2,277,505 | Barker | Mar. 24, 1942 |
| 2,291,975 | Minero | Aug. 4, 1942 |
| 2,390,479 | Watson | Dec. 4, 1945 |
| 2,539,443 | Lee | Jan. 30, 1951 |
| 2,547,102 | Wallach | Apr. 3, 1951 |
| 2,594,422 | Gordon | Apr. 29, 1952 |
| 2,586,595 | Ashby | Feb. 19, 1952 |